United States Patent [19]

Kelley

[11] Patent Number: 4,656,566
[45] Date of Patent: Apr. 7, 1987

[54] THERMO LIGHT HANDLE

[76] Inventor: Robert J. Kelley, P.O. Box 6, Buckley, Mich. 49682

[21] Appl. No.: 883,525

[22] Filed: Jul. 8, 1986

[51] Int. Cl.[4] .............................................. F21R 7/00
[52] U.S. Cl. .................... 362/202; 362/109; 362/154; 362/205; 16/110 R; 16/114 R; 215/100 A; 215/13 R
[58] Field of Search ................ 362/253, 89, 101, 399, 362/109, 117, 119, 118, 120, 202, 154, 208, 205, 206; 215/100 R, 100 A, 101, 12 R, 12 A, 13 R; 206/541, 580, 542, 573; 16/110 R, 110.5, 111 R, DIG. 12, DIG. 18, DIG. 19

[56] References Cited

U.S. PATENT DOCUMENTS

| | | | |
|---|---|---|---|
| 2,209,086 | 7/1940 | Johnson | 362/117 |
| 2,579,087 | 12/1951 | Organ | 16/110 R X |
| 3,021,026 | 2/1962 | Clark | 215/100 A |
| 3,261,635 | 7/1966 | Talay | 215/100 A |
| 4,348,715 | 9/1982 | Christensen et al. | 362/202 X |
| 4,542,447 | 9/1985 | Quakenbush | 362/253 X |

Primary Examiner—Larry Jones
Attorney, Agent, or Firm—Douglas S. Bishop

[57] ABSTRACT

A combination flashlight/handle attachment for a thermos bottle or other cylindrical beverage container comprising a removable handle mechanism containing a flashlight casing with operating switch, the operating switch being positioned so that it may be operated by the hand gripping the handle. The handle/light combination is easily affixed to the thermos bottle by pliable straps with fastening means, and can be easily removed for cleaning and storage.

6 Claims, 3 Drawing Figures

4,656,566

THERMO LIGHT HANDLE

BACKGROUND OF THE INVENTION

The combination of a light and other mechanism to provide a dual function apparatus is generally known. Illustrations of prior art setting forth this particular embodiment are U.S. Pat. No. 691,036 to Williams; U.S. Pat. No. 822,402 to Summers; U.S. Pat. No. 1,231,146 to Ferry; U.S. Pat. No. 1,309,541 to O'Neal; U.S. Pat. No. 3,231,730 to Wagner; U.S. Pat. No. 4,060,929 to Meyer, et al; and U.S. Pat. No. 4,542,447 to Quakenbush. Adaptations of this concept have included a firearm flashlight, as in the Quakenbush patent, listed above, a lamp with a basket attached thereunder, as in the Ferry patent, listed above, and a combination tool tray and extention light as in the Wagner patent, also listed above.

The existing prior art fails to provide an apparatus which provides the combination of an added handle assembly incorporating a flashlight mechanism. Adaptations of the concept of light/apparatus combinations have tended to add only a single additional function, i.e. the light. For the most part such prior art tends only to create a dual function apparatus wherein the additional function, although utilitarian, does not necessarily enhance the use of the apparatus with which it is combined. None of the prior art applications are directed to combination and use with a thermos bottle or other cylindrical beverage container.

Accordingly, a need exists for a combination handle/light attachment for a thermos bottle which will combine handle and lighting functions and enhance the use of a thermos bottle in a variety of situations.

DISCLOSURE OF THE INVENTION

The present invention satisfies the need hereinbefore set forth by providing a removable combination light/handle attachment for use with a thermos bottle or other cylindrical beverage container in which the contained beverage is poured from the end of the container. Both the handle function and light function may operate separately or in concert with each other to facilitate and improve the use of a thermos bottle in a variety of situations. Additionally, when the invention is utilized separately as a flashlight, the thermos bottle or beverage container may be transported without additional carrying capability.

In the preferred embodiment of the invention, the handle component provides the means for most efficient carriage and inclination of the thermos for pouring or discharging its contents, while the flashlight component provides illumination for the pouring process and the receptacle into which the contents are discharged. Additionally, illumination is available for use as necessary in the activities of the person utilizing the invention to the same extent as would be evident if a separate flashlight were carried.

Other objects, advantages and novel features of this invention will be set forth and will become apparent in the detailed description which follows and with reference to the accompanying drawings, in which.

Figure 1:
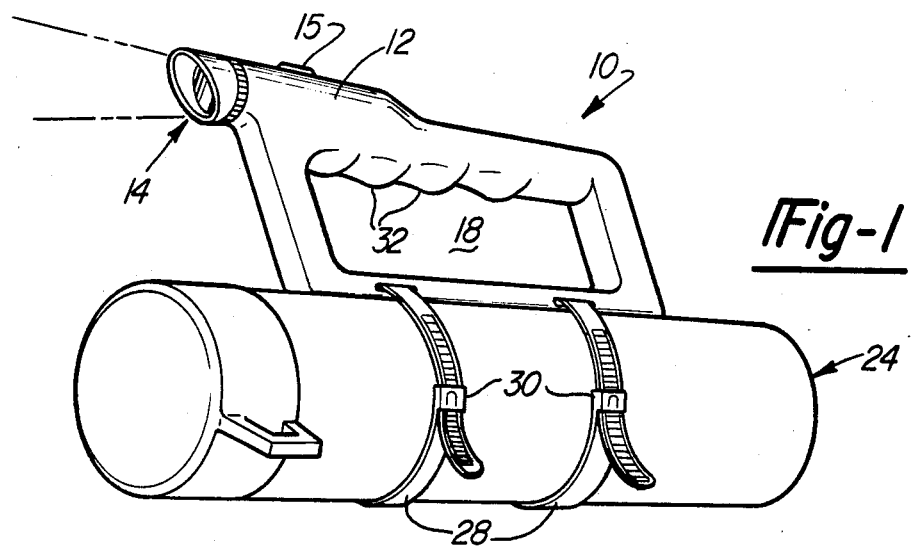
FIG. 1 is a perspective view of a preferred embodiment of the invention showing the device attached to a thermos bottle.
Figure 2:
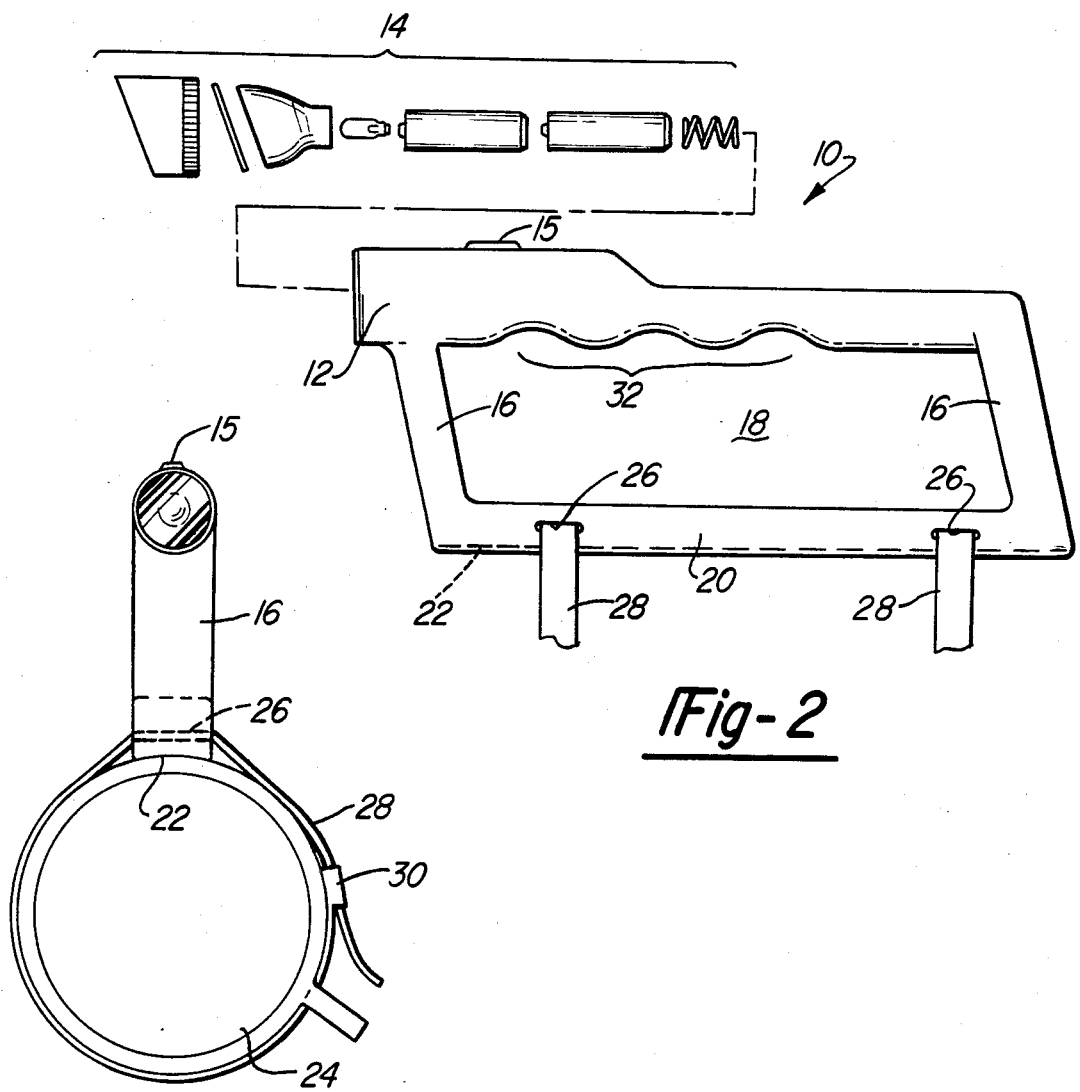
FIG. 2 is a side elevational view of the invention showing separated flashlight components thereof.
Figure 3:
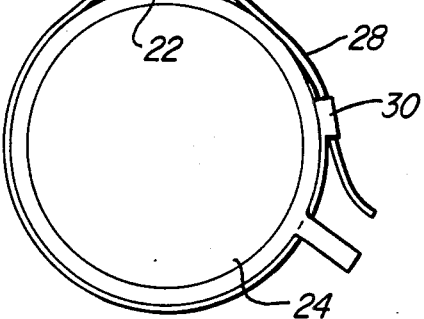
FIG. 3 is a frontal elevation of the invention attached to a thermos bottle partly broken away.

A preferred form of the invention is shown by reference to the drawings in particular.

The Thermo Light Handle comprises a principal, cylindrical member 10, containing a cylindrical flashlight casing 12, incorporating usual flashlight components 14, and incorporating a switch mechanism 15 on the exterior of the cylindrical member 10 in position to allow operation thereof by the same hand which is utilized to grip the cylindrical member 10. The underside of the cylindrical member 10 is a series of rounded projections 32 providing a gripping surface. Projecting at right angles in a common plane from the cylindrical member 10 are a plurality of horizontally spaced arms 16 with sufficient spacing 18 to allow the cylindrical member 10 to be gripped between them. Said horizontally spaced arms being attached to a support member 20 parallel to the cylindrical member 10, said support member 20 having a concave exterior surface 22 to provide maximum contact and stability with the thermos bottle 24. Attached to the support member 20 by appropriate means 26 are a plurality of straps 28 each having at its end means for securing same 30. The straps encircle the thermos bottle 24 and when fastened secure the bottle 24 against the support member 20.

What is claimed is:

1. A combination detachable handle and flashlight attachment for a thermos bottle or other cylindrical container adapted to simultaneously provide a means for transporting the container and provide illumination in the use thereof, comprising:
    (a) a hollow cylindrical member;
    (b) a flashlight casing containing a flashlight, bulb, battery holding means and electrical circuit forming means sufficient to provide an electrical connection;
    (c) a means of affixing said flashlight casing with the hollow cylindrical member;
    (d) a switch for closing the electrical circuit;
    (e) said switch affixed to the exterior of the cylindrical member housing the flashlight casing;
    (f) a plurality of horizontally spaced arms extending from the cylindrical member in a common plane, sufficiently spaced to allow the cylindrical member to be gripped between them;
    (g) a support member affixed to the ends of said arms, parallel to the principal cylindrical member;
    (h) a plurality of straps with means for affixing said straps to the support member;
    (i) a means for securing said straps around the thermos bottle or other cylinder.

2. A combination detachable handle and flashlight attachment for a thermos bottle or other cylindrical container as set forth in claim 1, wherein the parallel support member is outwardly concave to maximize contact with and stability of the attached thermos bottle or other container.

3. A combination detachable handle and flashlight attachment for a thermos bottle or other cylindrical container as set forth in claim 1, wherein the switch mechanism is located on the exterior of the cylinder in a position to facilitate operation thereof by a hand gripping said member.

4. A combination detachable handle and flashlight attachment for a thermos bottle or other cylindrical container as set forth in claim 1, wherein the entire device, exclusive of the flashlight housing and mechanism and attached straps, is constructed of one-piece molded plastic.

5. A combination detachable handle and flashlight attachment for a thermos bottle or other cylindrical container as set forth in claim 1, including a plurality of rounded projections on the interior surface of the principal cylindrical member to facilitate gripping thereof.

6. A combination detachable handle and flashlight attachment for a thermos bottle or other cylindrical container as set forth in claim 1, wherein the support member contains a plurality of horizontal perforations perpendicular to said member sufficient to allow the straps to pass through as a means of affixing the same.

* * * * *